(12) United States Patent　　(10) Patent No.: US 8,000,058 B2
Iwakura et al.　　(45) Date of Patent: Aug. 16, 2011

(54) MAGNETIC HEAD FOR PERPENDICULAR RECORDING HAVING POLE PIECES PROVIDED ON SURFACE OF SOFT MAGNETIC FILM

(75) Inventors: Tadayuki Iwakura, Kanagawa (JP);
Youji Maruyama, Saitama (JP);
Masafumi Mochizuki, Tokyo (JP);
Ichiro Ohdake, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 479 days.

(21) Appl. No.: 11/258,468

(22) Filed: Oct. 24, 2005

(65) Prior Publication Data

US 2006/0087765 A1　Apr. 27, 2006

(30) Foreign Application Priority Data

Oct. 25, 2004　(JP) ................. 2004-309106

(51) Int. Cl.
*G11B 5/265*　(2006.01)
*G11B 5/31*　(2006.01)
*G11B 5/39*　(2006.01)
(52) U.S. Cl. .......... 360/123.09; 360/125.06; 360/125.22
(58) Field of Classification Search ............. 360/119.02, 360/123.02, 125.02–124.04, 125.06, 125.16, 360/125.22, 125.49, 125.56, 125.62, 123.09
See application file for complete search history.

(56) References Cited

U.S. PATENT DOCUMENTS

| 5,187,860 | A | * | 2/1993 | Horibata et al. | 29/603.08 |
| 6,452,743 | B1 | * | 9/2002 | Sasaki | 360/125.43 |
| 6,624,970 | B1 | * | 9/2003 | Sasaki | 360/125.56 |
| 6,724,572 | B1 | * | 4/2004 | Stoev et al. | 360/125.43 |
| 7,292,409 | B1 | * | 11/2007 | Stoev et al. | 360/125.45 |
| 7,310,204 | B1 | * | 12/2007 | Stoev et al. | 360/123.02 |
| 2003/0053251 | A1 | * | 3/2003 | Yoshida et al. | 360/126 |
| 2003/0200647 | A1 | * | 10/2003 | Kamijima | 29/603.18 |
| 2003/0227714 | A1 | * | 12/2003 | Parker et al. | 360/125 |
| 2004/0037002 | A1 | * | 2/2004 | Kudo et al. | 360/126 |
| 2004/0150912 | A1 | * | 8/2004 | Kawato et al. | 360/126 |
| 2004/0201918 | A1 | * | 10/2004 | Guan et al. | 360/125 |
| 2004/0240110 | A1 | * | 12/2004 | Matono | 360/126 |
| 2005/0024771 | A1 | * | 2/2005 | Le | 360/126 |
| 2005/0128637 | A1 | * | 6/2005 | Johnston et al. | 360/125 |

FOREIGN PATENT DOCUMENTS

| JP | 60-083209 | 5/1985 |
| JP | 2002-092820 | 3/2002 |
| JP | 2002-100005 | 4/2002 |
| JP | 2002-100006 | 4/2002 |
| JP | 2002-100007 | 4/2002 |

(Continued)

*Primary Examiner* — Craig A. Renner
*Assistant Examiner* — Carlos E Garcia
(74) *Attorney, Agent, or Firm* — Patterson & Sheridan, LLP

(57) ABSTRACT

Embodiments of the invention provide a perpendicular recording magnetic head capable of reducing leakage magnetic fields from the soft magnetic films on the air bearing surface side and reducing the protrusion of the soft magnetic films in the direction of the air bearing surface side due to thermal deformation of the soft magnetic films. In one embodiment, the write functional section includes a coil conductor, second soft magnetic film pattern and first soft magnetic film pattern that cover the coil conductor from top and bottom and are magnetically coupled to each other, and a main magnetic pole piece determining a track width. The read functional section includes a reading element sandwiched between two magnetic shield films. A pedestal magnetic pole pattern is formed at the frontal end position of the first soft magnetic film pattern.

18 Claims, 12 Drawing Sheets

FOREIGN PATENT DOCUMENTS

| | | |
|---|---|---|
| JP | 2002-197619 | 7/2002 |
| JP | 2004-039148 | 2/2004 |
| JP | 2004-086961 | 3/2004 |
| JP | 2004-227745 | 8/2004 |
| JP | 2004-281017 | 10/2004 |
| JP | 2004-295987 | 10/2004 |
| WO | WO 2004/003892 | 1/2004 |

* cited by examiner

| Thickness (um) | Amount of protrusion (nm) |
|---|---|
| 0.5 | 0.572 |
| 1 | 1.17 |
| 1.5 | 1.326 |
| 2 | 1.617 |
| 2.5 | 1.853 |
| 3 | 2.102 |
| 4 | 2.352 |

Calculation conditions

Ni80Fe20 : Material characteristics

| YM E (N/cm²) | CTE (/K) |
|---|---|
| 2.10E+07 | 1.20E−0.5 |

CTE : Coefficient of linear thermal expansion
YM  : Young's modulus

Temperature

| ΔT (°C) | 30 |
|---|---|

MAGNETIC HEAD FOR PERPENDICULAR RECORDING HAVING POLE PIECES PROVIDED ON SURFACE OF SOFT MAGNETIC FILM

CROSS-REFERENCES TO RELATED APPLICATIONS

This application claims priority from Japanese Patent Application No. JP2004-309106, filed Oct. 25, 2004, the entire disclosure of which is incorporated herein by reference.

BACKGROUND OF THE INVENTION

The present invention relates to a magnetic head for a magnetic disk drive. More particularly, the invention relates to a magnetic recording head structure suitable for a perpendicular magnetic recording type magnetic disk drive in which a magnetic film having an axis of easy magnetization in a perpendicular direction with respect to the surface of a recording medium is to be used therein.

Semiconductor memories and magnetic memories are mainly used in the storage (recording) devices of information apparatus. In terms of access time, semiconductor memories are used as internal storage devices, and in terms of capacity and nonvolatility, magnetic disk drives are used as external storage devices. The recording media of magnetic disk drives use a glass or aluminum substrate, on which magnetic thin films are deposited. A functional section with electromagnetic conversion (i.e., a write functional section) is used to write magnetic information onto such recording media. Also, a functional section (read functional section) that utilizes a magnetoresistive phenomenon or a giant magnetoresistive phenomenon or an electromagnetic induction phenomenon is used to read magnetic information. These functional sections are provided in input/output components called "magnetic heads".

The storage capacity is an important index expressing the performance of the magnetic disk drive. Along with the development of the information society in recent years, large-capacity and compact magnetic disks are being demanded from markets. Among recording schemes suitable for meeting these demands is a perpendicular recording scheme, which uses the media having an axis of easy magnetization in a perpendicular direction with respect to a recording surface. This scheme allows the enhancement of density, and is therefore considered to prevail in lieu of the conventional longitudinal recording scheme.

Magnetic heads for perpendicular recording are each constructed by forming a read functional section and a write functional section in layered form on a slider. The read functional section has an upper shield and a lower shield, between both of which is sandwiched a reading element having a portion thereof exposed to an air bearing surface. The write functional section has the main magnetic pole piece and subsidiary magnetic pole piece that form a magnetic gap on the air bearing surface side and are magnetically coupled to each other at opposite sides with respect to the air bearing surface. The write functional section also has a coil provided between the main magnetic pole piece and the subsidiary magnetic pole piece.

A recording magnetic field from the main magnetic pole piece acts on a recording medium and reverses the magnetization of a recording layer. For perpendicular magnetic recording, since the magnetic field components in a perpendicular direction need to be used to record, a soft magnetic film, called the soft underlayer (SUL), is provided at a lower portion of the recording layer. The main magnetic pole piece and SUL face each other, and thus a strong magnetic field of the perpendicular field components can be generated. The magnetic fluxes in SUL are returned to the soft magnetic film of the magnetic head that functions as the subsidiary magnetic pole piece, and turn about. Although the soft magnetic film is designed with a great width, the magnetic field is concentrated at the end of the soft magnetic film by a geometrical effect and if its influence is significant, magnetic information may be erased from the recording medium in a wide range.

Patent Document 1 (Japanese Patent Laid-Open No. 2002-100006) discloses a construction where the end of an auxiliary magnetic pole piece (subsidiary magnetic pole piece) on the air bearing surface side is spaced from the air bearing surface. Allowing the auxiliary magnetic pole piece to be spaced apart from the air bearing surface spreads a magnetic gap with respect to SUL present at the bottom of the medium, increases magnetic resistance, and thus allows leakage magnetic fluxes to be reduced.

Stray magnetic fields, however, act not only in a perpendicular direction, but also a horizontal direction to the medium surface. Countermeasures against this problem are disclosed in Patent Document 2 (Japanese Patent Laid-Open No. 2002-197619). The technique disclosed therein solves the problem by covering the element that executes reading and writing with a soft magnetic film.

Patent Document 3 (U.S. Patent Application Publication No. 2003/0227714) discloses a structure in which a shield is provided between a coil and an air bearing surface in order to reduce the leakage magnetic field generated from a subsidiary magnetic pole piece during recording.

BRIEF SUMMARY OF THE INVENTION

In the construction described in above Patent Document 2, although the magnetic head element can be shielded against stray magnetic fields, the magnetic head element needs to be covered with a soft magnetic film of a large scale for the volume of the magnetic head element. Accordingly, the problem occurs in that when the element is activated in a high-temperature condition, the shield section of a large volume is thermally expanded to cause the end of the soft magnetic film to protrude from the air bearing surface and come into contact with the recording medium surface. In addition, even in the state where such contact can be avoided, local distortion effects on the air bearing surface appear as the tribological problem in that the lubricating material previously applied to the medium surface leaps onto the corresponding section. Hence, the deterioration of device life and other problems occur.

The above events mean the approach between the shield section and the recording medium, and this approach, in turn, causes the phenomenon that the air pressure contributing to flying increases and acts in the direction of increasing the flying height of the slider. That is to say, although this phenomenon causes the shield section to further approach the medium, other sections move away therefrom, thus increasing the magnetic distances between the main magnetic pole piece and other function sections and the medium surface. The increase in the magnetic distance between the element and the recording medium may cause the effect that during recording, applying a strong magnetic field to the recording medium becomes difficult and this makes magnetic information writing at high density virtually impossible.

Furthermore, because of the construction where the coil is to be covered with a large shield, the problem is also observed in that spatially passing magnetic fluxes originally not involved with recording are collected by the shield and guided to the recording medium. Hence, the need arises to limit the quantity of fluxes which the coil can generate, and this results in the problem in that a strong magnetic field cannot be generated. As can be seen from these facts, the performance of the device is not improved to a level at which it can bring out the advantages of high density that the perpendicular magnetic recording scheme possesses.

In the construction described in above Patent Document 3, although the leakage magnetic fields from the coil during recording can be reduced, the ends of the soft magnetic films are not in an approaching state with respect to the air bearing surface and is therefore coupled to the main magnetic pole piece at a position distant from the air bearing surface. Accordingly, magnetic coupling between the soft magnetic film provided in the vicinity of the air bearing surface and the soft magnetic film coupled to the main magnetic pole piece is very weak and thus a reduction effect against the leakage magnetic fields is extremely insignificant. This means that since the ends of the soft magnetic films covering the coil from top and bottom face the air bearing surface and are not in an approaching state with respect thereto, an overflow of fluxes into the main magnetic pole piece results in excess fluxes leaking from the vicinity of the front end which determines track width.

A feature of the present invention is to provide a perpendicular recording magnetic head capable of reducing leakage magnetic fields from the soft magnetic films on the air bearing surface side and reducing the protrusion of the soft magnetic films in the direction of the air bearing surface side due to thermal deformation of the soft magnetic films.

In accordance with an aspect of the present invention, a perpendicular recording magnetic head includes: a write functional section including a coil conductor; first and second soft magnetic films provided at the top and bottom of the coil conductor, both soft magnetic films having a spacing therebetween on the air bearing surface sides thereof and being magnetically connected to each other at the respective rear ends; a main magnetic pole piece magnetically connected to one of the first and second soft magnetic films and defining a recording track width; and a pedestal magnetic pole piece provided on the air bearing surface side of at least one of the first and second soft magnetic films; and a read functional section provided adjacently to the write functional section and having a reading element disposed between upper and lower magnetic shield films.

In some embodiments, the pedestal magnetic pole piece has a depth substantially equal to the film thicknesses of the first and second soft magnetic films at which the pedestal magnetic pole piece is provided. At least one of the first and second soft magnetic films is spaced apart from the air bearing surface side. The main magnetic pole piece may be connected to the second soft magnetic film, the second soft magnetic film is spaced from the air bearing surface side at a distance equal to at least the longitudinal dimension of the pedestal magnetic pole piece, and a height of the pedestal magnetic pole piece is equal to that of a soft magnetic layer which connects the first and second soft magnetic films. The main magnetic pole piece may be connected to the second magnetic film, the second soft magnetic film is spaced from the air bearing surface side at a distance equivalent to at least the longitudinal dimension of the pedestal magnetic pole piece, and a width of the main magnetic pole piece is smaller than that of the pedestal magnetic pole piece. The main magnetic pole piece may be connected to the second magnetic film disposed at the top of the coil conductor, and the pedestal magnetic pole piece is provided adjacently to the first soft magnetic film disposed at the bottom of the coil conductor.

In specific embodiments, the pedestal magnetic pole piece may be provided adjacently to the second soft magnetic film disposed at the top of the coil conductor, and the main magnetic pole piece may be connected to the second soft magnetic film via the pedestal magnetic pole piece. The pedestal magnetic pole piece may be provided adjacently to the first soft magnetic film disposed at the bottom of the coil conductor, and the main magnetic pole piece may be connected to the first soft magnetic film via the pedestal magnetic pole piece. The pedestal magnetic pole piece may be provided adjacently to each of the first and second magnetic films, and the main magnetic pole piece may be connected to the first soft magnetic film disposed at the bottom of the coil conductor via the pedestal magnetic pole piece. The main magnetic pole piece may be connected to the first magnetic film disposed at the bottom of the coil conductor, and the pedestal magnetic pole piece may be provided adjacently to the second soft magnetic film disposed at the top of the coil conductor.

In some embodiments, at least one of the first and second soft magnetic films is formed of an Ni (44-47 wt %)-Fe (56-53 wt %) alloy. The pedestal magnetic pole piece is an Ni (44-47 wt %)-Fe (56-53 wt %) alloy or a permalloy magnetic film including at least an NiFe alloy. The first soft magnetic film at the bottom of the coil conductor may be convex-shaped with respect to the air bearing surface side, the pedestal magnetic pole piece may be provided along the convex shape of the first soft magnetic film, and the main magnetic pole piece may be connected to the second magnetic film at the top of the coil conductor.

In accordance with another aspect of the invention, a perpendicular recording magnetic head includes: a write functional section including: a first coil conductor; a second coil conductor; a first soft magnetic film provided below the first coil conductor, a second soft magnetic film provided between the first and second coil conductors, and a third soft magnetic film provided above the second coil conductor, the three soft magnetic film having a spacing therebetween on air bearing surface sides thereof and being magnetically connected to one another at the rear ends thereof; a main magnetic pole piece magnetically connected to the second soft magnetic film provided between the first coil conductor and the second coil conductor and defining a recording track width; and first and second pedestal magnetic pole pieces provided facing the main magnetic pole piece, on the air bearing surface side of the first and second soft magnetic films; and a read functional section provided adjacently to the write functional section and having a reading element disposed between upper and lower magnetic shield films.

In some embodiments, the first and third soft magnetic films and the first and second pedestal magnetic pole pieces are spaced apart from the air bearing surface.

According to the present invention, it is possible to provide a perpendicular recording magnetic head capable of reducing leakage magnetic fields from the soft magnetic films on the air bearing surface side and reducing the protrusion of the soft magnetic films in the direction of the air bearing surface side due to thermal deformation of the soft magnetic films.

DETAILED DESCRIPTION OF THE INVENTION

Figure 2:
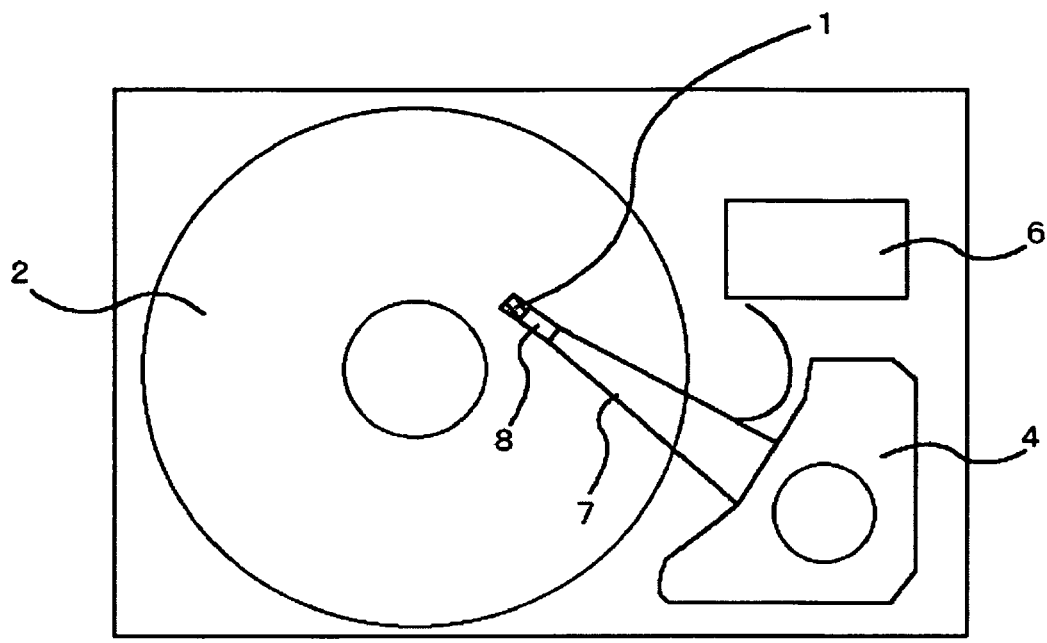
FIG. 2A is a plan view of a magnetic disk drive having the perpendicular recording magnetic head according to the first embodiment of the present invention.
FIG. 2B is a cross-sectional view of the magnetic disk drive having the perpendicular recording magnetic head according to the first embodiment of the present invention.
Figure 2:
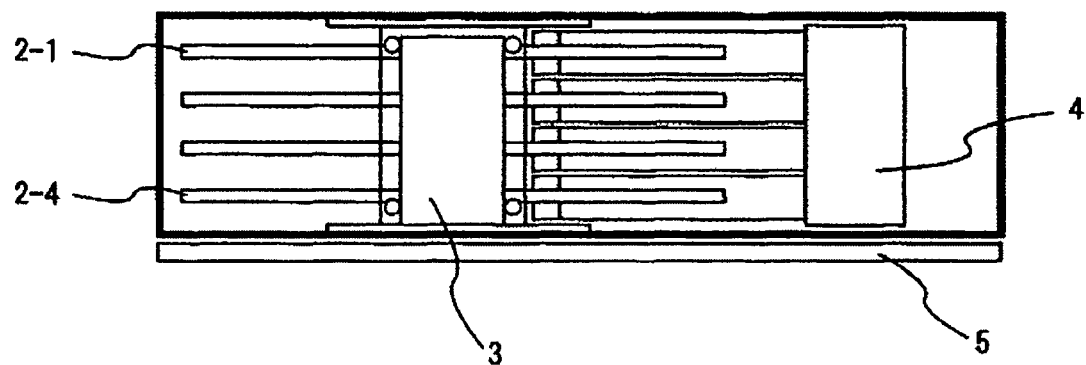

A basic configuration of a magnetic disk drive which uses a perpendicular recording magnetic scheme is shown in FIGS. 2A and 2B. FIG. 2A is a plan view of the drive, and FIG. 2B is a cross-sectional view of the drive. A recording medium 2 is connected directly to a motor 3, and rotated during input/output of information. A magnetic head 1 is installed on a suspension 8, and supported by a rotary actuator 4 via an arm 7. The suspension 8 has a function that holds the magnetic head 1 above the recording medium 2 with required force. Processing of reading signals and input/output of information require a signal-processing circuit 5 and a reading/writing circuit 6, which are provided in a main unit of the drive.

The magnetic head 1 moves along the surface of the recording medium 2 with pivotal motion of the rotary actuator 4, and after being placed in an arbitrary position, implements magnetic information writing or reading functions. Electric circuits for controlling these functions coexist with the signal-processing circuit 5.

Figure 1:
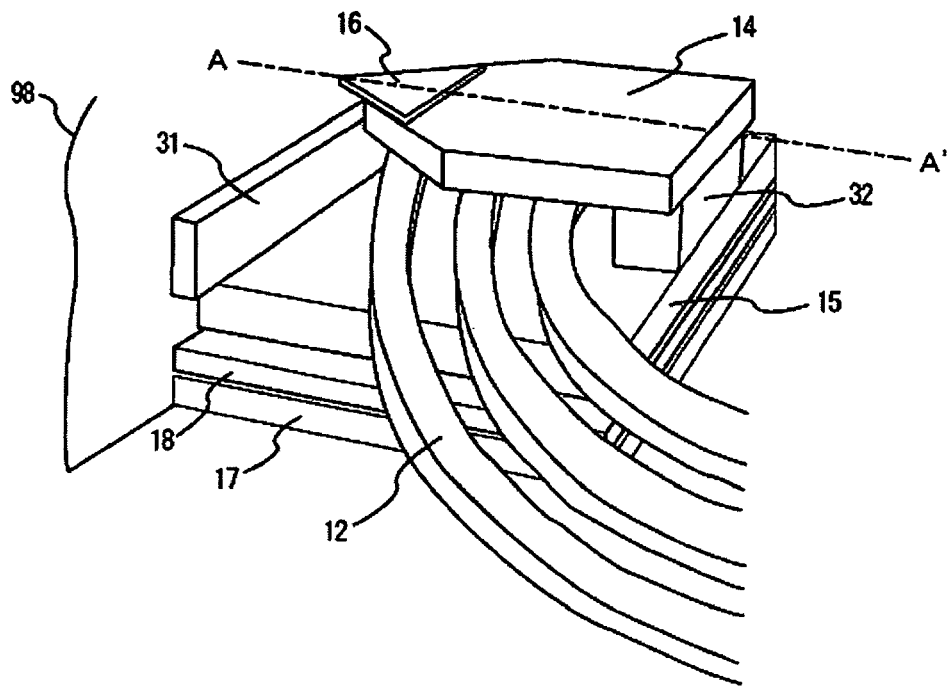
FIG. 1A is a perspective view of a perpendicular recording magnetic head according to a first embodiment of the present invention.
FIG. 1B is a cross-sectional view taken along line A-A' in FIG. 1A.
Figure 1:
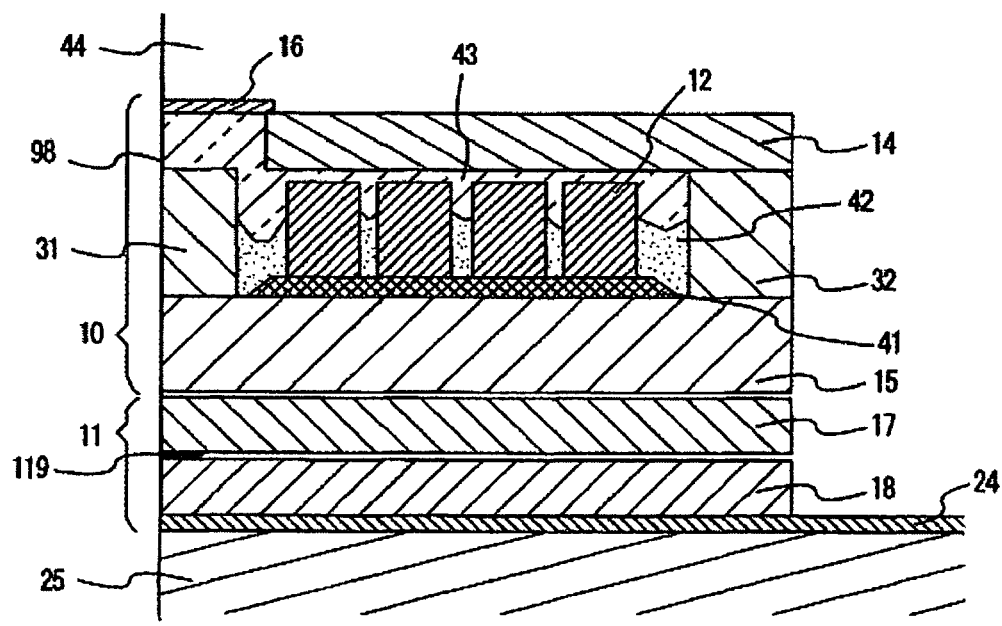

A perpendicular recording magnetic head according to a first embodiment of the present invention is described below using FIGS. 1A and 1B. FIG. 1A is a view taken from an oblique direction of a magnetic head element section. FIG. 1B is a cross-sectional view taken along line A-A' of FIG. 1A. A write functional section includes a coil conductor 12, a second soft magnetic film (second soft magnetic film pattern) 14 and a first soft magnetic film (first soft magnetic film pattern) 15, these soft magnetic films being provided in such a form as to cover the coil conductor from top and bottom and being magnetically connected to each other, and a main magnetic pole piece 16 defining a recording track width. These structural members are formed after formation of a substrate 25 (slider) made of $Al_2O_3$—TiC, an underlayer 24 laminated thereon with $Al_2O_3$, and a read functional section 11 produced further thereon for information reading. The read functional section 11 is constructed so as to have a reading element 119 sandwiched between two magnetic shield films 17 and 18. In the present embodiment, a CPP (Current Perpendicular to Plane) element is used as the reading element 119. The reading element 119 can be a giant magnetoresistive (GMR) element instead of CCP.

Next, details of the write functional section 10 are described below. A recording section includes at least: a coil conductor 12 constructed of copper (Cu) with a thickness of about 2.0 µm; a first soft magnetic film pattern 15 and a second soft magnetic film pattern 14, both of the film patterns enclosing the coil conductor 12 from top and bottom; a fourth soft magnetic film pattern 32 magnetically connecting the first and second soft magnetic film patterns (15, 14, respectively) at rear ends thereof; and a main magnetic pole piece 16 facing the surface of a medium and defining a recording track width. Forming the main magnetic pole piece 16 as a separate layer different from the second soft magnetic film pattern 14 can allow the second soft magnetic film pattern to be spaced apart from an air bearing surface without allowing a recording magnetic pole piece to be spaced therefrom, and cover the coil with the soft magnetic films. A pedestal magnetic pole piece and the second soft magnetic film can be magnetically approached in the neighborhood of the air bearing surface, and leakage magnetic fluxes from the main magnetic pole piece and the subsidiary magnetic pole piece can be reduced as a result.

The coil conductor 12, as shown in FIG. 1B, is electrically insulated with an insulating underlayer 41 of 0.2-µm-thick alumina, and with a layer of hot-treated resist resin 42. A space between the coil conductor 12 and the second soft magnetic film pattern 14 is covered with an alumina-formed nonmagnetic insulating film 43 to minimize thermal deformation. At the top of the main magnetic pole piece 16 is provided an alumina-formed protective film 44 to protect the entire element.

The first soft magnetic film pattern 15 and the second soft magnetic film pattern 14 are about 30 µm wide and about 20 µm deep. Both the magnetic film patterns are each set to a thickness of about 2 µm. The widths of these members are restricted by the design of the slider air bearing surface that defines flying height, and their widths suitable for a low-flying magnetic head for high-density recording range from approximately 10 to 50 µm.

In consideration of thermal deformation, it is preferable that their depths be as small as possible. Depths from 5 to 20 µm, however, are suitable since it is necessary to cover the coil conductor having a desired number of turns. Although thinner magnetic film patterns are less insusceptible to thermal deformation, reduction in thickness correspondingly accelerates magnetic saturation at their ends and, hence, erasure of the magnetic information retained directly thereunder. Additionally, reduction in thickness correspondingly deteriorates supply efficiency of magnetic fluxes from the coil conductor, thus causing the problem in that recording characteristics deteriorate. In view of the restrictions on the widths of the soft magnetic film patterns, suitable thickness ranges from approximately 0.5 to 3.0 μm.

In the present embodiment, the first soft magnetic film pattern 15 is constructed of an Ni46 wt %-Fe54 wt % alloy having a thickness of 2 μm. A (pedestal magnetic pole pattern) 31 also constructed of an Ni46 wt %-Fe54 wt % alloy having a thickness of 2 μm is formed at an end position of the first soft magnetic film pattern 15. A permalloy magnetic film provided with an NiFe alloy is suitable for forming the pedestal magnetic pole piece. Especially the permalloy magnetic film comprising Ni of 75% to 85% is suitable. The pedestal magnetic pole pattern measures 2 μm thick (high), 30 μm wide, and 1 μm deep. Increasing the thickness or width of the pedestal magnetic pole pattern correspondingly increases an area of its exposure on the air bearing surface side and is therefore valid for reducing leakage magnetic fluxes. Furthermore, when permalloy is used for the pedestal magnetic pole piece, since a saturation flux density of the film is as low as about 1 T, using permalloy is effective in reducing leakage magnetic fields. In the present embodiment, independently producing the main magnetic pole piece and the upper soft magnetic film 14 makes it possible to assign to the pedestal magnetic pole pattern 31 the same height as that of the fourth soft magnetic film 32 which connects the first and second soft magnetic films. Formation of both patterns can be consequently simplified.

The depth of the pedestal magnetic pole piece depends on the amount of thermal deformation, and a smaller depth value gives higher performance. However, if the depth is less than approximately 1 μm (i.e., under the conditions where the thickness of the pattern extremely decreases below the film thicknesses of the soft magnetic films), this causes the problem in that the pedestal magnetic pole pattern magnetically saturates.

Figure 3:
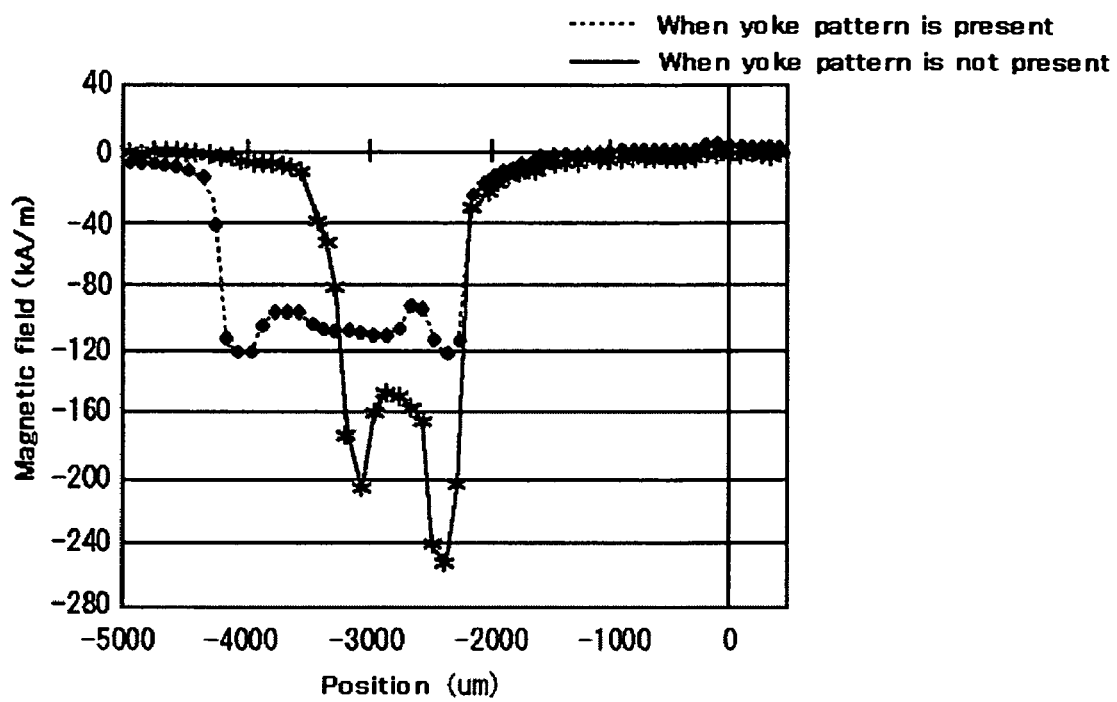
FIG. 3A is a diagram explaining the effects of the present invention, and is a graph showing calculation results on leakage magnetic fields.
FIG. 3B is a diagram representing the relationships between different film thicknesses of a magnetic material and associated amounts of thermal deformation.
FIG. 3C is a diagram showing calculation conditions associated with FIG. 3B.

Next, advantageous effects of the present embodiment are described below. First, attention is focused on leakage magnetic fields. Calculation results are shown in FIG. 3A. These calculation results are shown for comparison between two cases. One is the case where a pedestal magnetic pole pattern 31 measuring 2 μm thick, 30 μm wide, and 1.5 μm deep was provided at the air-bearing surface opposed end of a soft magnetic film pattern 15 measuring 2 μm thick, 30 μm wide, and 18 μm long. The other is the case where the above pedestal magnetic pole pattern was not provided at the above position. Both cases assume an external magnetic field of 4 kA/m (50 Oe).

The calculation results in FIG. 3A indicate that an initial leakage magnetic field of about 256 kA/m (3.2 kOe) in the absence of a pedestal magnetic pole pattern can be reduced to about 120 kA/m (1.5 kOe) by providing the above pedestal magnetic pole pattern. This effect can be accounted for as below. That is, the stray magnetic field applied from the outside passes through the soft magnetic layer (called SUL) laminated at the bottom of the recording medium, and then flows out at the soft magnetic film pattern edge exposed to the air bearing surface of the magnetic head. Increasing an area of the magnetic pole piece facing the medium makes it possible to prevent concentration of inflow magnetic fluxes and is thus effective in reducing the leakage magnetic field applied from a corresponding end.

Also, the magnetic fluxes occurring during recording are guided from the main magnetic pole piece through a recording layer of the medium to SUL and then returned once again to the soft magnetic film pattern (also called "subsidiary magnetic pole pieces") that constitutes the magnetic head. For this function, as the soft magnetic film pattern exposed to the air bearing surface is increased in area, the concentration of inflow magnetic fluxes is also correspondingly suppressed. It is possible, as this effect, to solve the problem in that magnetic information is erased in the vicinity of the soft magnetic film pattern edge.

The fact this effect can likewise be yielded by increasing the thickness of the soft magnetic film pattern will be readily understandable by persons skilled in the art. However, another problem arises because the amount of thermal deformation of the soft magnetic film greatly depends on the film thickness. Calculation results on relationships between different film thicknesses of a magnetic material and respective amounts of thermal deformation are shown in FIG. 3B (a size of an associated structure is the same as that assumed in the above magnetic field calculations). Although the calculations relate to a permalloy film (Ni80Fe20), it goes without saying that other magnetic films also exhibit the same tendency in terms of the relationship between film thickness and the amount of thermal deformation.

Attention is focused on the calculation results shown in FIG. 3B (calculation conditions are shown in FIG. 3C). The amount of thermal deformation with respect to a temperature rise of 30° C. is 2.35 nm for a film thickness of 4 μm. It can be seen, therefore, that the amount of thermal deformation is about 0.7 nm greater than that for a film thickness of 2 μm. Deformation in a direction of the air bearing surface side means that the recording medium and a protruding section of the magnetic head approach each other, and this poses a problem in ensuring reliability of the magnetic disk drive.

It can be understood from these calculation results that the film needs to be thinned down to reduce the amount of thermal deformation. In the present invention, therefore, the is provided only on the air bearing surface side where a leakage magnetic field is to be lowered in strength, and the rear ends of the soft magnetic film patterns are thinned down, for reduced thermal deformation of the ends, to the same thicknesses as those of the patterns themselves. Consequently, it is possible to prevent the concentration of magnetic fluxes on the air bearing surface side and to reduce the amount of thermal deformation.

Measurements on thermal deformation have been performed to verify the following. That is, compared with the measurement results obtained merely by increasing the film thicknesses of the soft magnetic film patterns (4-μm thickness: 2.35 nm/30° C.), the amounts of deformation can be reduced by about 1.2 nm for a temperature rise of 50° C. by providing a pedestal magnetic pole pattern (2-μm pedestal thickness +2-μm thickness: 1.62 nm/° C.).

The results mean that the distance between the magnetic head and the recording medium can be reduced by about 1.2 nm. The distance between the magnetic head and the recording medium is an important factor in determining a critical recording density of the magnetic disk drive, and an improvement of about 1 nm is equivalent to approximately 10% improvement of recording density. It is therefore understood that a high-density magnetic recording device can be realized by using the perpendicular recording magnetic head of the present embodiment.

Figures 3, 4:
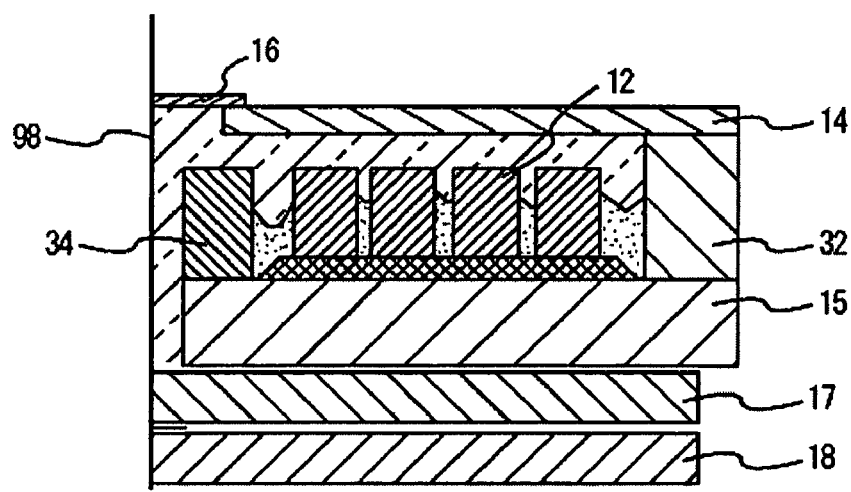
FIG. 4A is a view showing a modification example of the first embodiment.
FIG. 4B is a view showing another modification example of the first embodiment.
FIG. 4C is a view showing still another modification example of the first embodiment.
Figure 4:
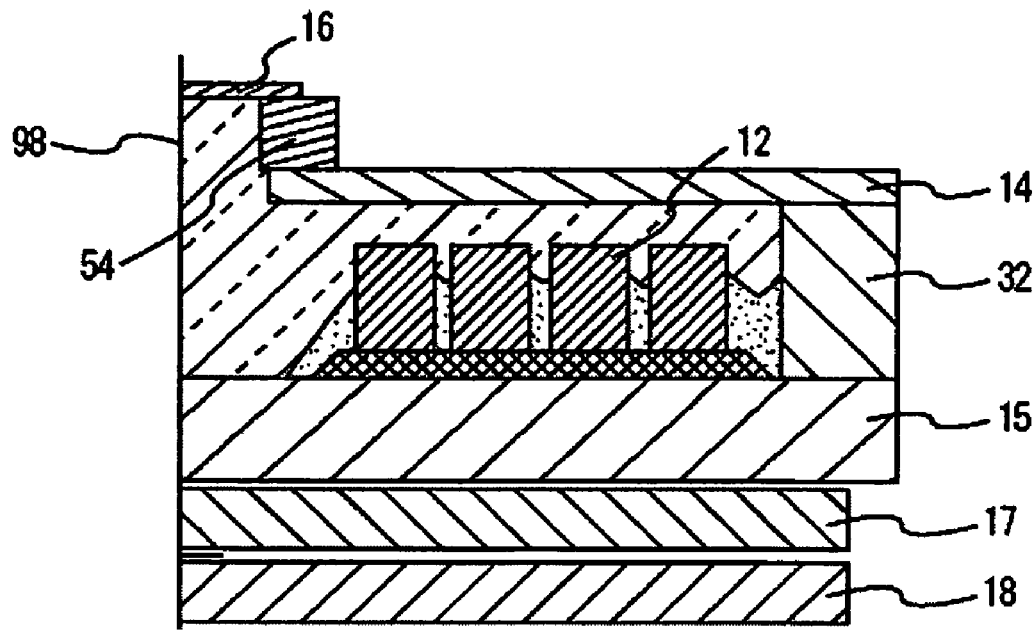
Figure 4:
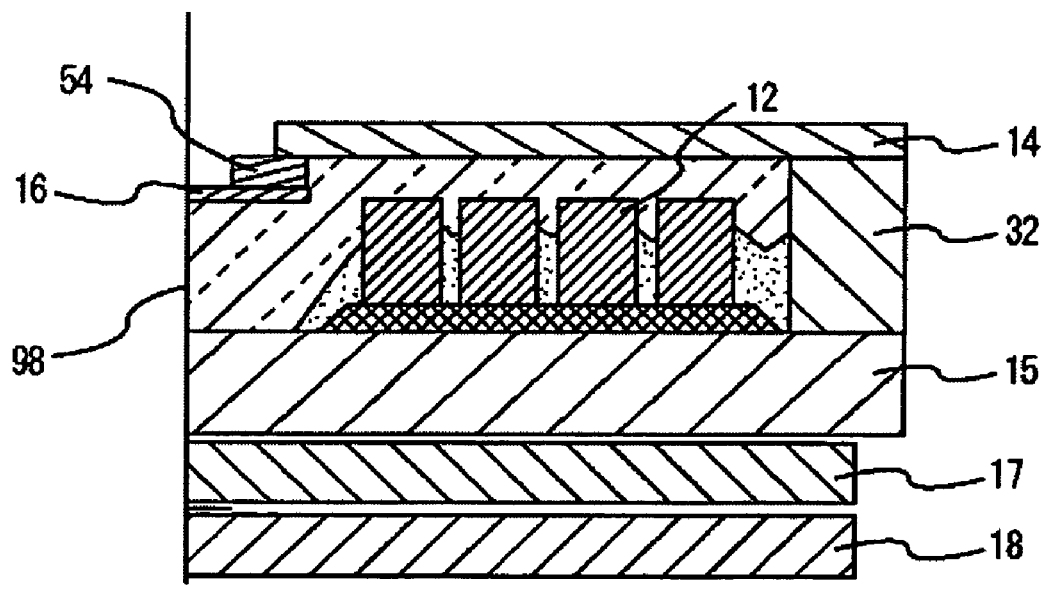

Next, modification examples of the above first embodiment are described below. The configuration shown in FIG. 4A is characterized in that a first soft magnetic film pattern 15 magnetically connected to a pedestal magnetic pole pattern 34 is spaced at a distance within 3 μm from an air bearing surface 98. It has already been mentioned that reducing a relative distance with respect to the medium surface, i.e., a distance between the soft magnetic film pattern and the air bearing surface, is likewise valid for reducing a leakage magnetic field from a corresponding end of the soft magnetic film pattern. This configuration is applicable to the above first embodiment having a pedestal magnetic pole pattern. However, merely reducing a distance from the air bearing surface (hereafter, also referred to as a backward distance) causes a problem since a nonmagnetic film exists between the air bearing surface and a wide face approaching the air bearing surface. If the distance from the air bearing surface is too small, a lack of mechanical strength of the thin nonmagnetic film causes a problem such as peeling-off.

Experiments with a sputtering-laminated alumina film as the nonmagnetic film have been conducted in a backward distance range from 0.1 to 5.0 nm. It has been consequently verifiable that when a pedestal magnetic pole pattern measuring 30 μm wide and 2 μm thick is provided, an insulator present at approximately a backward distance section does not peel off for a backward distance setting of 0.2 μm. It has also been experimentally verifiable that for a thickness setting of 3 μm, peeling-off can be prevented by further increasing the backward distance, and thus that an appropriate measure can be instituted by setting the backward distance to approximately 0.3 μm.

It has already been mentioned that the above range of backward distances depends on the area of the pedestal magnetic pole pattern. Experimental results of the present inventors indicate that when the pedestal magnetic pole pattern is narrowed to 10 μm in width and set to a thickness of 2 μm, the nonmagnetic film does not peel off even if the backward distance is reduced to a minimum value of about 0.15 μm.

As set forth above, even in the configuration where the first soft magnetic film pattern including the pedestal magnetic pole pattern is spaced apart from the air bearing surface, it is possible to increase a cross-sectional area present on the air bearing surface side to be lowered in leakage magnetic field, and hence to thin down the rear end. At the same time, therefore, thermal deformation can be reduced. This makes it possible to prevent erasure of magnetic information due to leakage magnetic fields, and to reduce the protrusion of the magnetic poles due to increases in temperature.

In addition, as shown in FIG. 4B, it is possible to provide a pedestal magnetic pole pattern 54 on the side facing a second soft magnetic film pattern 14. In this configuration, a main magnetic pole piece 16 is provided on the second soft magnetic film pattern 14. In this example, even if the second soft magnetic film pattern 14 is extremely thinned down, a leakage magnetic field from an end of this pattern can be reduced. This effect can be described as the effect of the cross-sectional area on an air bearing surface 98 being increased by providing the pedestal magnetic pole pattern 54. Accordingly, a perpendicular head almost free from thermal deformation can be realized since it is possible to prevent the malfunction of magnetic fluxes excessively concentrating on the main magnetic pole piece 16 and to thin down the second soft magnetic film pattern 14.

A similar effect is also observable in an example of, as shown in FIG. 4C, providing the pedestal pattern 54 on a lower side of the second soft magnetic film pattern 14 (i.e., at a lower end of this pattern when viewed on the drawing, at the inflow side of the medium). This is due to the effect of an increase in the cross-sectional area at the air bearing surface 98 similarly to FIG. 4B. This example is characterized in that the main magnetic pole piece 16 can be brought closer to the read functional section than in the above example. There is the advantage that formatting efficiency on the recording medium surface improves with a decrease in the distance between the read functional section and the main magnetic pole piece 16 for recording.

In magnetic disk drives, during read/write operations, a recording medium moves from the read functional section side to the recording unit side. If these sections are spatially distant from each other, the need arises to wait for operation while the medium moves. If the space is narrow enough, however, there is an advantage that only a purely electrical switching time is required before input/output operation can be executed. For this reason, this configuration becomes one of the methods which can be used to implement a function element layout advantageous for enhancement of recording density.

Figure 5:
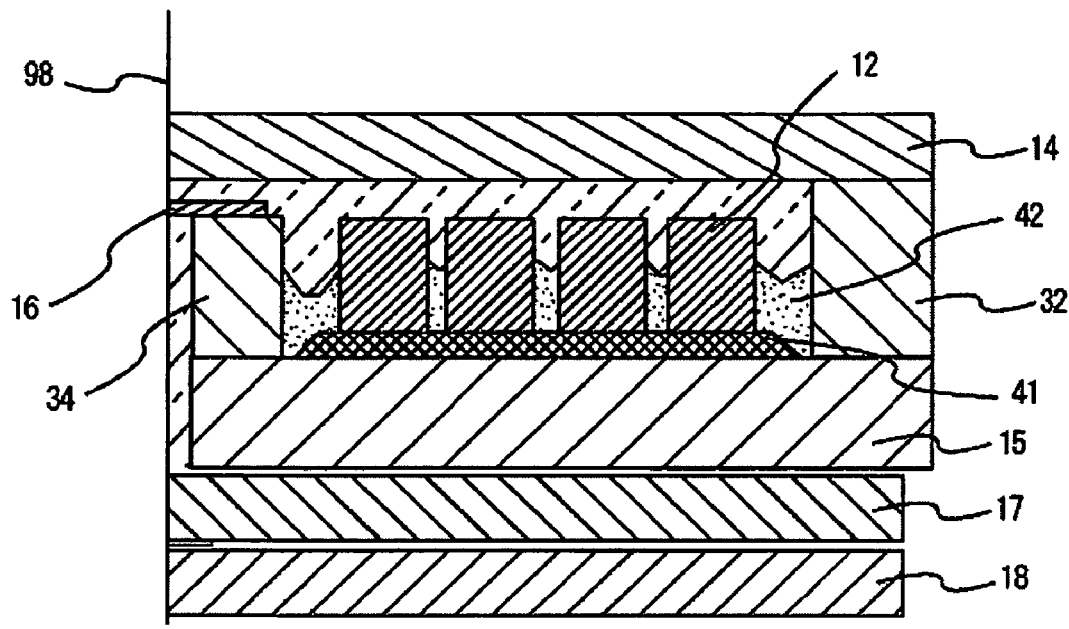
FIG. 5A is a cross-sectional view of a perpendicular recording magnetic head according to a second embodiment of the present invention.
FIG. 5B is a view showing a modification example of the second embodiment.
Figure 5:
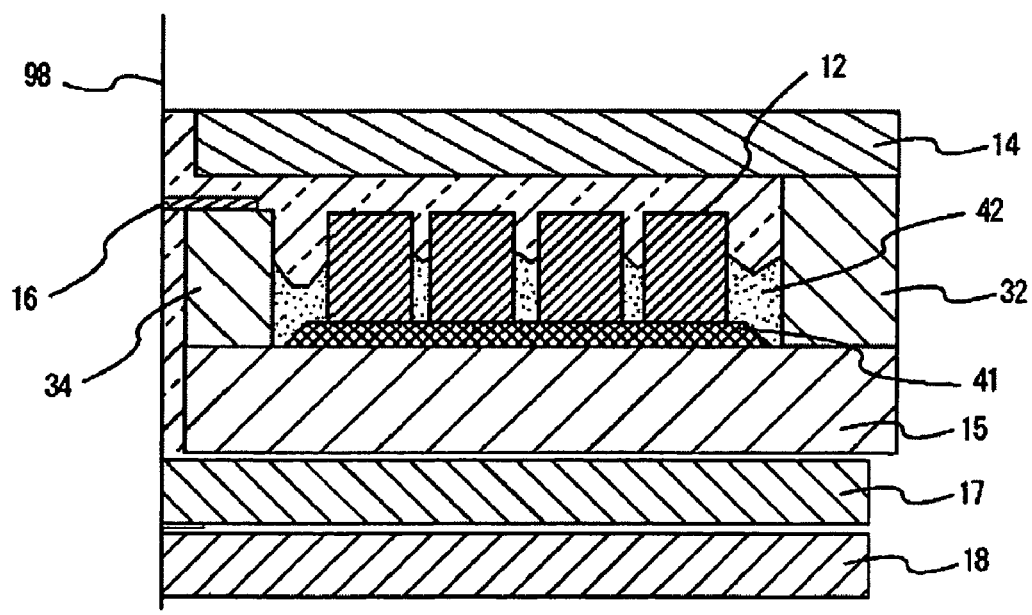

The configuration where the second soft magnetic film pattern and the main magnetic pole piece are connected to each other is employed in the above first embodiment and its modification examples. A second embodiment is below described in which, as shown in FIG. 5A, a main magnetic pole piece 16 is positioned on the side facing a first soft magnetic film pattern 15. Although FIG. 5A shows only a cross-sectional view, since a great deal of description has already been given herein, persons skilled in the art will be able to readily understand the particular configuration. When, as shown in FIG. 5A, the main magnetic pole piece 16 is positioned on the side facing the first soft magnetic film pattern 15, a pedestal magnetic pole pattern 34 is provided between the main magnetic pole piece 16 and the first soft magnetic film pattern 15. A cross-sectional area of the first soft magnetic film pattern 15, on the air bearing surface side, can be increased by providing the pedestal magnetic pole pattern 34, and hence, a leakage magnetic field can be reduced.

One feature of this configuration exists in that even when a coil conductor 12 positioned between the first soft magnetic film pattern 15 and a second soft magnetic film pattern 14 is made thick (for the purpose of reducing the electrical resistance which generates heat), it is possible to shorten a distance between the main magnetic pole piece 16 and the second soft magnetic film pattern 14 which is to serve as a subsidiary magnetic pole piece. The distance between the main magnetic pole piece 16 and the second soft magnetic film pattern 14 to serve as a subsidiary magnetic pole piece is shortened to increase a magnetic field gradient on the outflow side. In addition, a magnetic field gradient on the trailing side which determines magnetization transition quality can be increased by narrowing to a suitable value the distance with respect to the subsidiary magnetic pole piece that takes opposite polarity. Recording with a high linear recording density thus becomes possible.

Providing the above-described pedestal magnetic pole pattern 34 on the air bearing surface side of the first soft magnetic film pattern 15 suppresses concentration of the magnetic load occurring on the air bearing surface, and prevents thermal deformation from deteriorating. A similar effect can also be obtained in an example of, as shown in FIG. 5B, allowing an edge of the second soft magnetic film pattern 14 to be spaced apart from the air bearing surface 98. In particularly in this example, a leakage magnetic field from the edge of the second soft magnetic film pattern 14 can be further reduced by allowing this edge to be spaced apart from the air bearing surface.

A method of allowing each section to be spaced can be implemented by using a lithographic technique similar to that used in a semiconductor device manufacturing process. For manufacture of magnetic head elements, advanced light-exposure technologies that employ a scanner type of very-short-wavelength laser light aligner are already placed in use, and this does not present problems associated with highly accurate control of backward distances.

Figure 6:
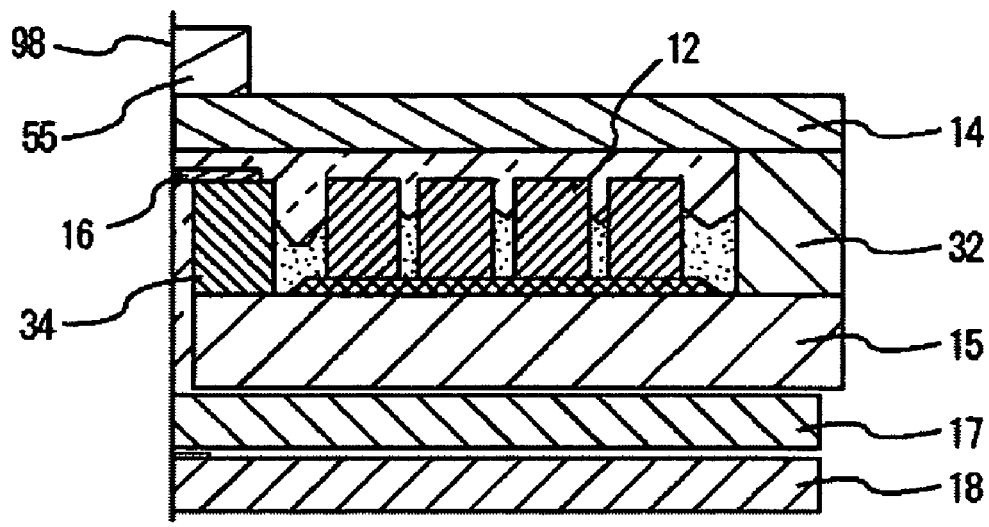
FIG. 6A is a view showing another modification example of the second embodiment.
FIG. 6B is a view showing still another modification example of the second embodiment.
FIG. 6C is a view showing a further modification example of the second embodiment.
Figure 6:
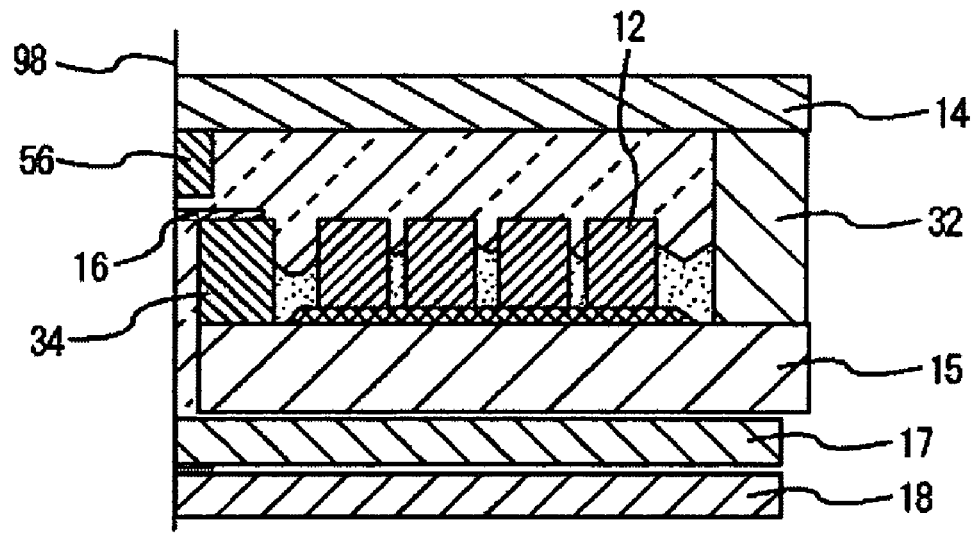
Figure 6:
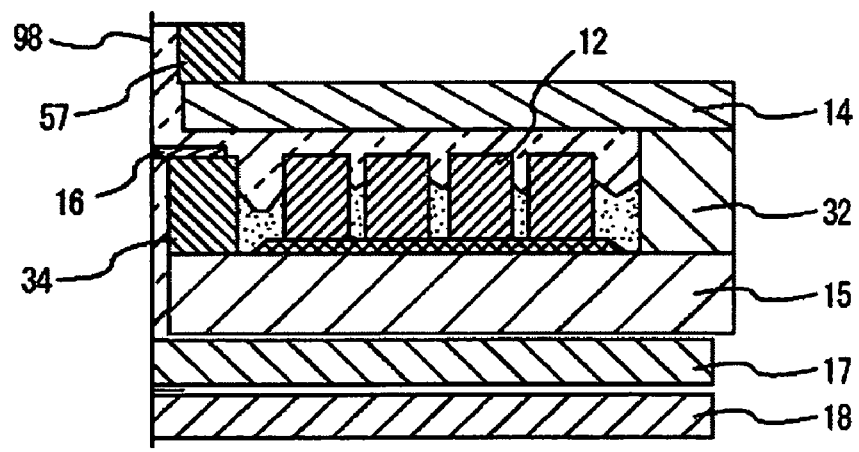

In the above-described second embodiment with the pedestal magnetic pole pattern provided on the first soft magnetic film pattern side, a second pedestal magnetic pole pattern can also be provided on the air bearing surface side of the second soft magnetic film pattern functioning as a subsidiary magnetic pole piece. Such examples are described below using FIGS. 6A, 6B, and 6C. First, FIG. 6A is an example of providing a second pedestal magnetic pole pattern 55 on the outflow side of the medium. In this example, it is possible not only to obtain an effect similar to that of FIG. 5A, but also to spread the area of the second soft magnetic film pattern 14, on the side facing the air bearing surface 98. A leakage magnetic field from that section can therefore be reduced.

Alternatively, as shown in FIG. 6B, it is possible to provide a second pedestal magnetic pole pattern 56 on the outflow side of the medium. In this configuration, the magnetic field gradient on the trailing side of the main magnetic pole piece can be increased by adjusting (narrowing) the distance between the second pedestal magnetic pole pattern 56 and the main magnetic pole piece 16. This effect makes it possible to increase the magnetic field gradient on the trailing side which determines magnetization transition quality. Recording with a high linear recording density is thus possible.

Another possible alternative is by adopting a configuration in which not only a second pedestal magnetic pole pattern 57 is provided on the second soft magnetic film pattern 14, as shown in FIG. 6C, but also is spaced apart from the air bearing surface 98. In this configuration, an area of the second soft magnetic film pattern 14, on the side facing the air bearing surface 98, is increased. In addition, since this pattern is spaced apart from the air bearing surface, a leakage magnetic field from that section can be reduced more significantly than in FIG. 6A.

In the above examples, since the rear ends of the soft magnetic film patterns 14, 15 can be thinned down, thermal deformation can also be reduced at the same time. This makes it possible to prevent erasure of magnetic information due to leakage magnetic fields, and to reduce the protrusion of the magnetic pole pieces due to increases in temperature.

Figure 7:
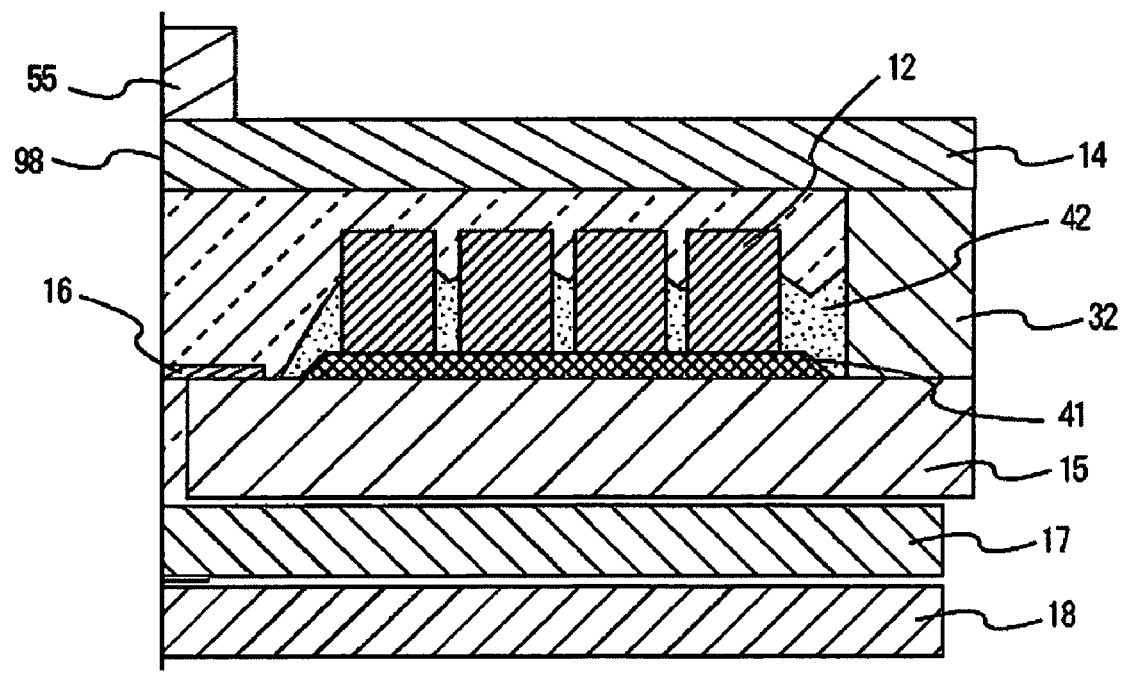
FIG. 7A is a view showing a further modification example of the second embodiment.
FIG. 7B is a view showing a further modification example of the second embodiment.
Figure 7:
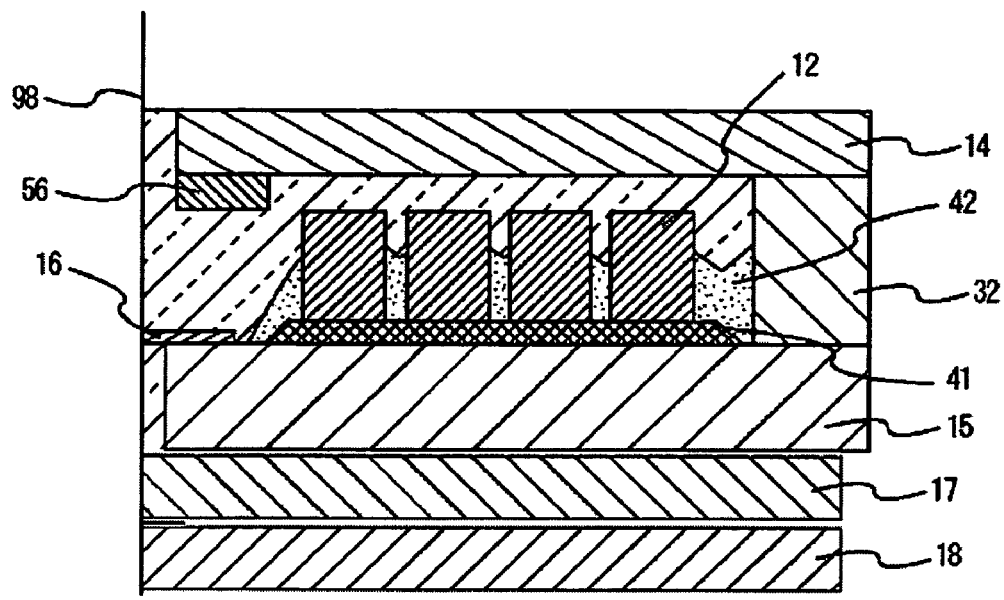

Still another possible alternative is by adopting a configuration in which, as shown in FIG. 7A, the second pedestal magnetic pole pattern 55 is left and the pedestal magnetic pole pattern on the side of the first soft magnetic film pattern is removed. The main magnetic pole piece 16 is connected directly to the first soft magnetic film pattern 15. In this example, the second pedestal magnetic pole pattern 55 is disposed on the second soft magnetic film pattern 14. It is therefore obvious from the above description that a leakage magnetic field from that end is reduced. This example, in particular, has an advantage that an element-manufacturing process can be simplified.

An example of, as shown in FIG. 7B, providing the second pedestal magnetic pole pattern 56 at the bottom of the second soft magnetic film pattern 14, has also an effect similar to that obtained in the above example of FIG. 7A. The magnetic field gradient on the trailing side of the main magnetic pole piece can be increased particularly by adjusting (narrowing) the distance between the second pedestal magnetic pole pattern 56 and the main magnetic pole piece 16. This effect clearly makes it possible to record information with a high linear recording density.

Figure 8:
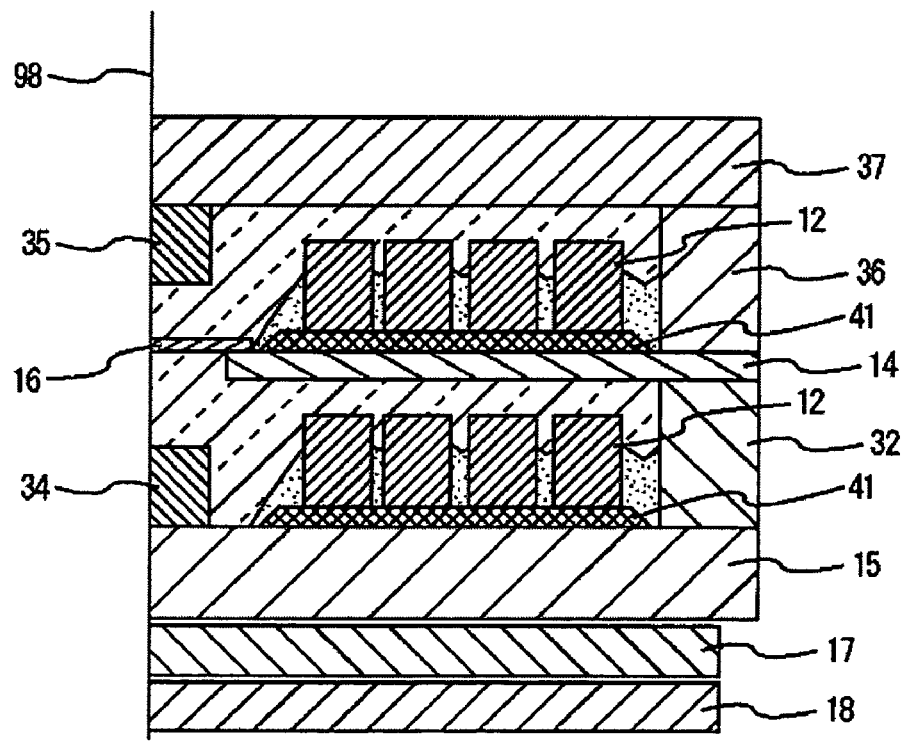
FIG. 8A is a cross-sectional view of a perpendicular recording magnetic head according to a third embodiment of the present invention.
FIG. 8B is a view showing a modification example of the third embodiment.
Figure 8:
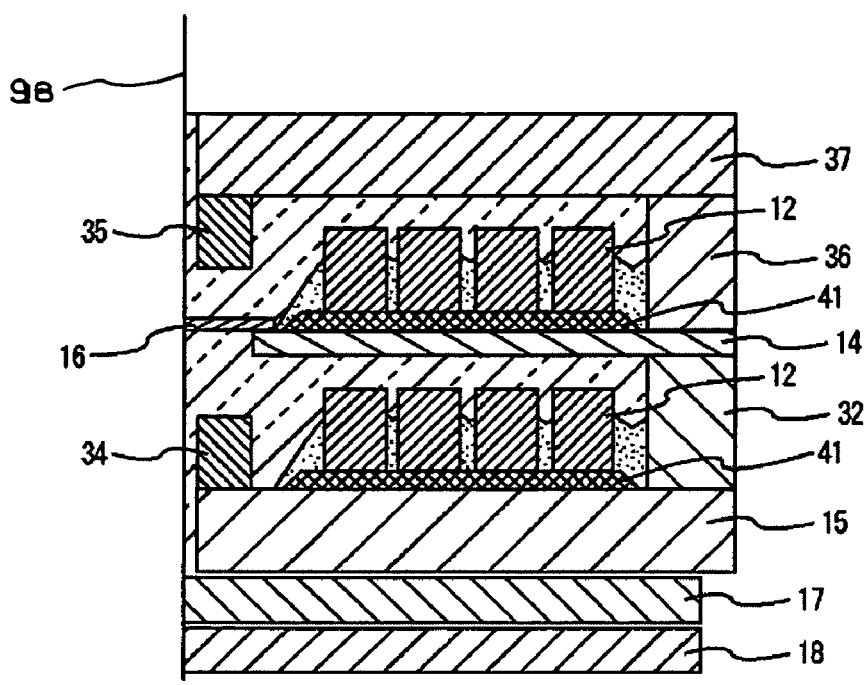

A perpendicular recording magnetic head according to a third embodiment of the present invention is shown in FIG. 8A. This magnetic head includes: first and second soft magnetic film patterns 15 and 14, respectively, that are arranged so as to cover a first coil conductor 12 from top and bottom; second and third soft magnetic film patterns 14 and 37, respectively, that are arranged so as to cover a second coil conductor 12 from top and bottom; fourth soft magnetic film patterns 32 and 36 magnetically coupling the first and third soft magnetic film patterns 15 and 37 at rear ends; and a main magnetic pole piece 16 magnetically connected to the second soft magnetic film pattern 14 and defining a recording track width.

A feature of the present embodiment exists in that the main magnetic pole piece 16 and the second soft magnetic film pattern 14 are present in a sandwiched condition between the respective two layers of coil 12. The first soft magnetic film pattern 15 and the third soft magnetic film pattern 37 are arranged externally to the two layers of coil 12. Also, the first soft magnetic film pattern 15 and the third soft magnetic film pattern 37 are magnetically connected to one another via the soft magnetic film patterns 32 and 36 at ends thereof distant from an air bearing surface 98.

In the present embodiment, in order to reduce leakage magnetic fields from the first and third soft magnetic film patterns 15, 37, a first pedestal magnetic pole pattern 34 and a second pedestal magnetic pole pattern 35 are arranged at those respective ends of the soft magnetic film patterns 15, 37, that face the air bearing surface 98. The pedestal magnetic pole patterns 34, 35 are 30 μm wide and 2 μm high (thick), and both are made of an Ni46 wt %-Fe54 wt % alloy.

In the present embodiment, since the magnetic pole area facing the air bearing surface 98 can likewise be increased by providing the pedestal magnetic pole patterns 34, 35, it is possible to reduce leakage magnetic fields from end positions. Additionally, regions not provided with a pedestal magnetic pole pattern can be thinned down, so that it is possible to reduce thermal deformation. These effects are similar to the effects already described in the first and second embodiments.

A unique effect obtained from the present embodiment resides in the following terms. That is, since the first soft magnetic film pattern 15 and the third soft magnetic film pattern 37 function as subsidiary magnetic pole pieces (the magnetic pole pieces to which magnetic fluxes are returned from the main magnetic pole piece), a density of the magnetic fluxes returned from the main magnetic pole piece when it is assumed that these magnetic fluxes are constant is reduced to about ½ of their original density, according to simple calculations. In the present embodiment, since a second pedestal magnetic pole pattern is further provided, leakage magnetic fields can be reduced more significantly than in any of the above two embodiments.

This structure, however, has the disadvantage that it is complex in terms of process. One idea for solving the process-associated problem is by employing a configuration in which the second soft magnetic film pattern 14 and the soft magnetic film patterns 32, 36 are not to be structurally coupled to each other. In this configuration, the soft magnetic film patterns 32 and 36 can be omitted. To omit these patterns, the need arises to adopt another method of coupling the rear ends of the first soft magnetic film pattern 15 and the third soft magnetic film pattern 37 magnetically. This method does not mean providing a magnetic material, in which context, it is valid to adopt a method of coupling the rear ends of both patterns by spreading rear-end regions or spatially bringing the above two patterns closer to each other.

Alternatively, it is also possible, as shown in FIG. 8B, to allow the soft magnetic film patterns 15, 37 respectively including the pedestal magnetic pole patterns 34, 35 to be spaced apart from the air bearing surface 98. This structure is characterized in that it is least insusceptible to the in-plane stray magnetic fields applied from outside. This structure is also characterized in that since the main magnetic pole piece is magnetically shielded from the first soft magnetic film pattern and the third soft magnetic film pattern 37, the structure is most excellent in yield strength against external magnetic fields.

A common problem in the structures where a magnetic pole piece is spaced apart from the air bearing surface is that since the magnetic distance with respect to SUL increases, recording efficiency is inferior. However, in the present embodiment having two subsidiary magnetic pole pieces (the first soft magnetic film pattern and the third soft magnetic film pattern), the magnetic resistance occurring across SUL can be reduced (a magnetic path area is large) and this effect makes impacts on recording characteristics invisible.

Figure 9:
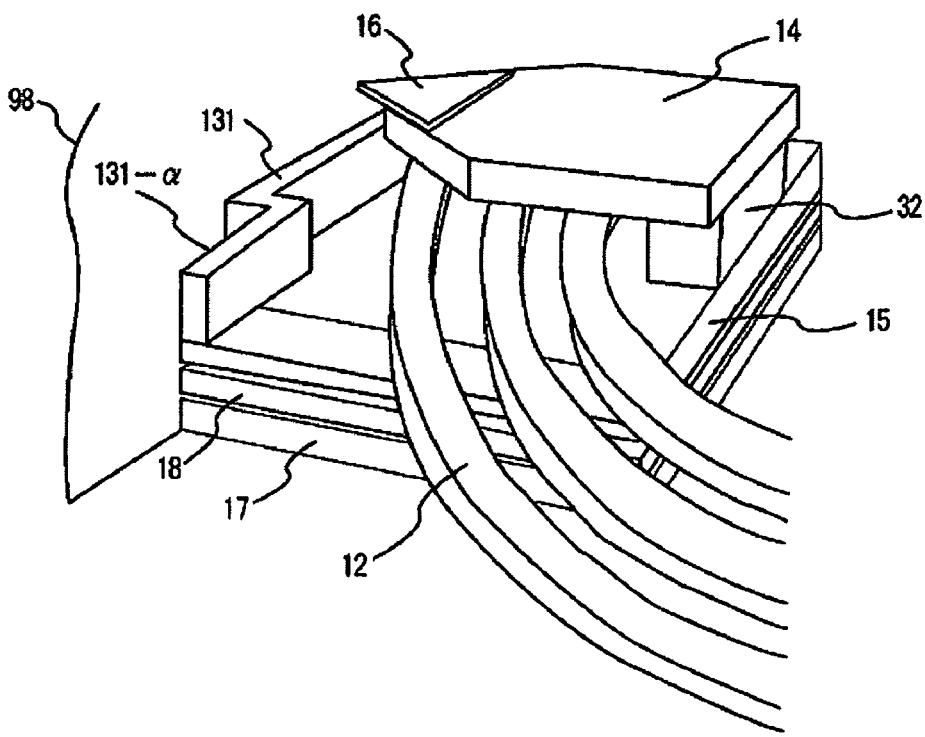
FIG. 9A is a perspective view of a perpendicular recording magnetic head according to a fourth embodiment of the present invention.
FIG. 9B is a plan view of FIG. 9A.
Figure 9:
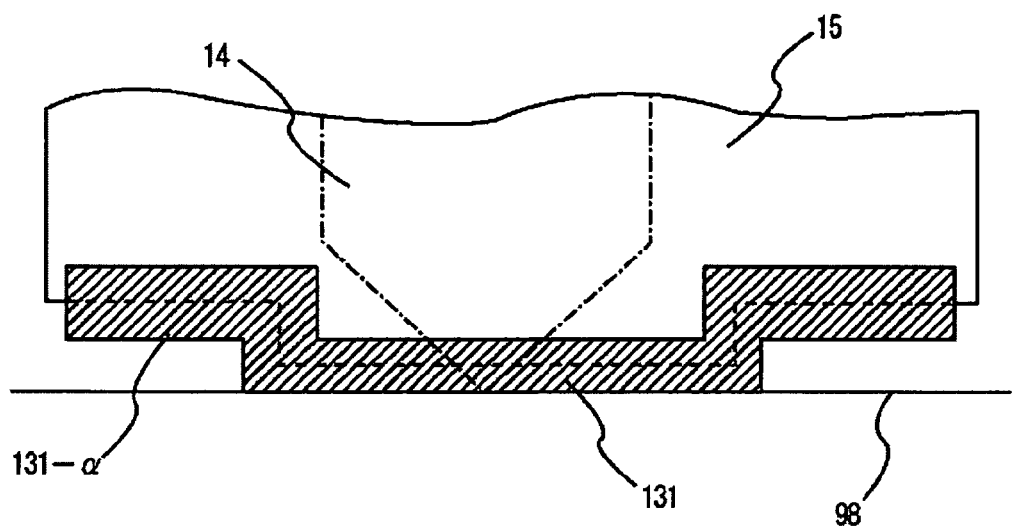

A fourth embodiment of the present invention is shown in FIGS. 9A and 9B. FIG. 9A is an oblique view of a magnetic head according to the present embodiment. FIG. 9B is a plan view of an element section (a view of this section when seen from a perpendicular direction with respect to an element-forming surface, with an air bearing surface positioned below). The present embodiment is characterized in that a pedestal magnetic pole pattern 131 has bend portions each including a region 131-α recessed from the air bearing surface 98. As shown in FIG. 9B, the bend portions are each formed along a bend provided on the air bearing surface side of a soft magnetic film pattern 15 (i.e., a convex bend toward the air bearing surface 98). Basics of the present invention exist in that a pedestal magnetic pole pattern is provided on the air bearing surface side of the soft magnetic film pattern 15. The basics are also valid when applied to soft magnetic film patterns of a non-rectangular shape, as in the present embodiment.

Figure 10:
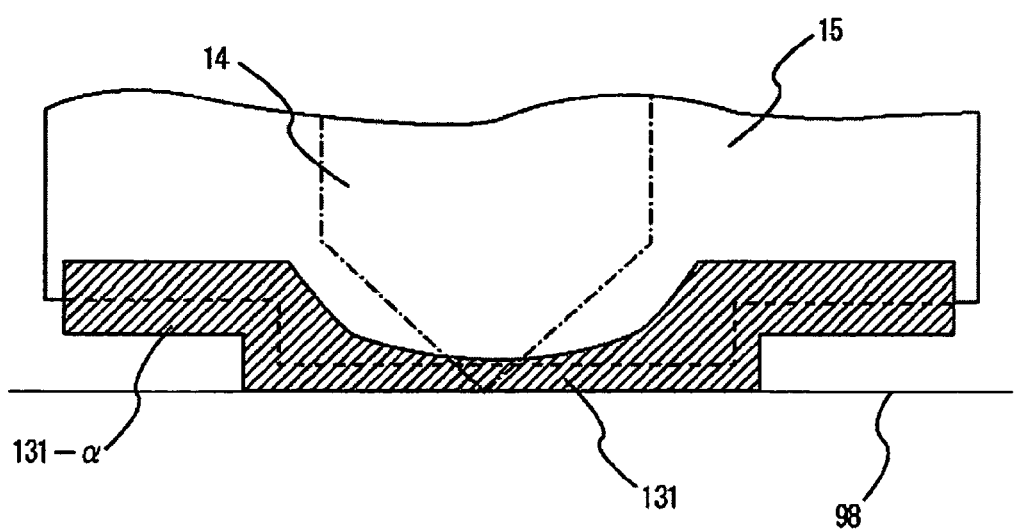
FIG. 10A is a plan view showing a modification example of the fourth embodiment.
FIG. 10B is a plan view showing another modification example of the fourth embodiment.
Figure 10B:
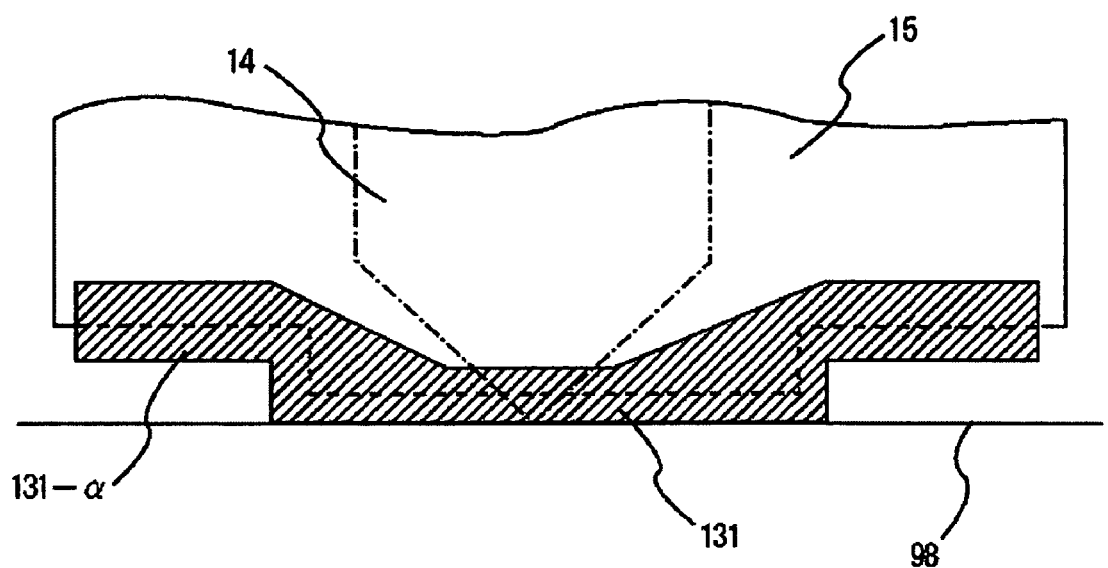

An effect similar to that of the above fourth embodiment can also be obtained in such modification examples of the present embodiment as shown in FIGS. 10A, 10B, wherein an edge of the pedestal magnetic pole pattern 131 formed on the side where an air bearing surface is not constructed of a polygonal shape (circle included). When the bend is formed into a polygonal shape, in particular, there is an advantage that patterns are easy to form (since actual patterns are rounded at corners).

There are also advantages such as the one that interference with the pedestal magnetic pole pattern edge during formation of a coil disappears and this increases a manufacturing yield. A similar effect can also be obtained when the bend at the pedestal magnetic pole pattern edge facing the air bearing surface is formed into a polygonal shape.

Features of the present embodiment and modification examples thereof apply when the air bearing surface side of the soft magnetic film patterns is formed into a convex shape. This convex shape is advantageous in that when leakage magnetic fields act from a lateral direction, the convex shape is effective in reducing concentration of a magnetic load at edges of the soft magnetic film patterns (the magnetic load can be split at the end forming the convex air bearing surface, and at the end recessed therefrom).

The convex configuration (shape) is also valid for not only the soft magnetic film patterns functioning during recording, but also the shield film patterns constituting the read functional section. To adopt this shape, in particular, it becomes an important design factor that all those convex sections (of the shield film patterns and the soft magnetic film patterns) that are exposed on the air bearing surface side should be aligned in a lateral direction of the convex sections (in that case, errors of about half the thickness of the pattern are permissible). The reason is that if a very wide section is present, the magnetic load will concentrate at that end and a strong magnetic field will occur directly under the end.

In the present embodiment and modification examples thereof, providing pedestal magnetic pole patterns selectively along the soft magnetic film pattern edges on the air bearing surface side makes it possible to increase the areas of the corresponding sections facing the air bearing surface. Leakage magnetic fields from these sections can be reduced as that effect. Also, at rear ends, thermal deformation can be reduced by forming each soft magnetic film pattern into a smaller film thickness, and as a result, protrusion of the magnetic pole piece s from the air bearing surface can be reduced. A high-density perpendicular recording magnetic head can be realized from the above effects.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A perpendicular recording magnetic head, comprising:
   a write functional section consisting of:
      a coil conductor, wherein the coil conductor is electrically insulated within the write functional section by an insulating underlayer, a layer of hot-treated resist resin, and a nonmagnetic insulating film;
      first and second soft magnetic films provided at the bottom and top of the coil conductor, the first and second soft magnetic films having a spacing therebetween on air bearing surface sides thereof and being magnetically connected to each other at rear ends thereof;
      a main magnetic pole piece magnetically connected to an upper surface of one of the first and second soft magnetic films, the main magnetic pole piece defining a recording track width; and
      a pedestal magnetic pole piece provided on the air bearing surface side and on an upper surface of at least one of the first and second soft magnetic films; and
   a read functional section provided adjacently to said write functional section, and having a reading element disposed between upper and lower magnetic shield films;
   wherein the pedestal magnetic pole piece has a thickness height in a direction parallel to an air bearing surface that is substantially equal to a film thickness of the soft magnetic film at which the pedestal magnetic pole piece is provided, and a width in a recording track width direction of the pedestal magnetic pole piece is substantially equal to a width in the recording track width direction of the soft magnetic film at which the pedestal magnetic pole piece is provided, and the thickness height is substantially maintained along the width of the pedestal magnetic pole piece, and;
   wherein a front end of the second soft magnetic film is formed away from the air bearing surface;

wherein the main magnetic pole piece and the pedestal magnetic pole piece are separate and distinct layers from the first and second soft magnetic films.

2. The perpendicular recording magnetic head according to claim 1, wherein the at least one of the first and second soft magnetic films is spaced apart from the air bearing surface side.

3. The perpendicular recording magnetic head according to claim 1, wherein:
the main magnetic pole piece is connected to the second soft magnetic film;
the second soft magnetic film is spaced from the air bearing surface side at a distance equivalent to or greater than a longitudinal dimension of the pedestal magnetic pole piece; and
a height of the pedestal magnetic pole piece is equal to a height of a soft magnetic layer connecting the first and second soft magnetic films.

4. The perpendicular recording magnetic head according to claim 1, wherein:
the main magnetic pole piece is connected to the second soft magnetic film;
the second soft magnetic film is spaced from the air bearing surface side at a distance equivalent to or greater than a longitudinal dimension of the pedestal magnetic pole piece; and
a width of the main magnetic pole piece is smaller than a width of the pedestal magnetic pole piece.

5. The perpendicular recording magnetic head according to claim 1, wherein:
the main magnetic pole piece is connected to the second soft magnetic film disposed at the top of the coil conductor; and
the pedestal magnetic pole piece is provided adjacently to the first soft magnetic film disposed at the bottom of the coil conductor.

6. The perpendicular recording magnetic head according to claim 1, wherein:
the pedestal magnetic pole piece is provided adjacently to the second soft magnetic film disposed at the top of the coil conductor; and
the main magnetic pole piece is connected to the second soft magnetic film via the pedestal magnetic pole piece.

7. The perpendicular recording magnetic head according to claim 1, wherein:
the pedestal magnetic pole piece is provided adjacently to the first soft magnetic film disposed at the bottom of the coil conductor; and
the main magnetic pole piece is connected to the first soft magnetic film via the pedestal magnetic pole piece.

8. The perpendicular recording magnetic head according to claim 1, wherein:
the pedestal magnetic pole piece is provided adjacently to each of the first and second soft magnetic films, and the main magnetic pole piece is connected to the first soft magnetic film disposed at the bottom of the coil conductor via the second magnetic pole piece.

9. The perpendicular recording magnetic head according to claim 1, wherein:
the main magnetic pole piece is connected to the first soft magnetic film disposed at the bottom of the coil conductor; and
the pedestal magnetic pole piece is provided adjacently to the second soft magnetic film disposed at the top of the coil conductor.

10. The perpendicular recording magnetic head according to claim 1, wherein at least either one of the first and second soft magnetic films is formed of an Ni (44-47 wt %)-Fe (56-53 wt %) alloy.

11. The perpendicular recording magnetic head according to claim 1, wherein the pedestal magnetic pole piece is an Ni (44-47 wt %)-Fe (56-53 wt %) alloy or a permalloy magnetic film formed of at least an NiFe alloy.

12. The perpendicular recording magnetic head according to claim 1, wherein:
the first soft magnetic film at the bottom of the coil conductor is convex-shaped with respect to the air bearing surface side, and the pedestal magnetic pole piece is provided along the convex shape of the first soft magnetic film; and
the main magnetic pole piece is connected to the second soft magnetic film disposed at the top of the coil conductor.

13. A perpendicular recording magnetic head, comprising:
a write functional section consisting of:
a coil conductor, wherein the coil conductor is electrically insulated within the write functional section by an insulating underlayer, a layer of hot-treated resist resin, and a nonmagnetic insulating film;
first and second soft magnetic films provided at the bottom and top of the coil conductor, the first and second soft magnetic films having a spacing therebetween on air bearing surface sides thereof and being magnetically connected to each other at rear ends thereof;
a main magnetic pole piece magnetically connected to an upper surface of one of the first and second soft magnetic films, the main magnetic pole piece defining a recording track width; and
a pedestal magnetic pole piece provided on the air bearing surface side and on an upper surface of at least one of the first and second soft magnetic films; and
a read functional section provided adjacently to said write functional section, and having a reading element disposed between upper and lower magnetic shield films;
wherein the pedestal magnetic pole piece has a thickness height in a direction parallel to an air bearing surface that is substantially equal to a film thickness of the soft magnetic film at which the pedestal magnetic pole piece is provided, and a width in a recording track width direction of the pedestal magnetic pole piece is substantially equal to a width in the recording track width direction of the soft magnetic film at which the pedestal magnetic pole piece is provided, and the thickness height is substantially maintained along the width of the pedestal magnetic pole piece;
wherein a front end of the second soft magnetic film is formed away from the air bearing surface;
wherein the main magnetic pole piece and the pedestal magnetic pole piece are separate and distinct layers from the first and second soft magnetic films;
wherein the main magnetic pole piece extends from the air bearing surface for a distance greater than the pedestal magnetic pole piece extends from the air bearing surface.

14. The perpendicular recording magnetic head according to claim 13, wherein at least either one of the first and second soft magnetic films is formed of an Ni (44-47 wt %)-Fe (56-53 wt %) alloy.

15. The perpendicular recording magnetic head according to claim 13, wherein the pedestal magnetic pole piece is an Ni (44-47 wt %)-Fe (56-53 wt %) alloy or a permalloy magnetic film formed of at least an NiFe alloy.

16. A perpendicular recording magnetic head, comprising:
a write functional section consisting of:
- a coil conductor, wherein the coil conductor is electrically insulated within the write functional section by an insulating underlayer, a layer of hot-treated resist resin, and a nonmagnetic insulating film;
- first and second soft magnetic films provided at the bottom and top of the coil conductor, the first and second soft magnetic films having a spacing therebetween on air bearing surface sides thereof and being magnetically connected to each other at rear ends thereof;
- a main magnetic pole piece magnetically connected to one of the first and second soft magnetic films, the first magnetic pole piece defining a recording track width; and
- a pedestal magnetic pole piece provided on the air bearing surface side of at least one of the first and second soft magnetic films; and
a read functional section provided adjacently to said write functional section, and having a reading element disposed between upper and lower magnetic shield films.

17. The perpendicular recording magnetic head according to claim 16, wherein at least either one of the first and second soft magnetic films is formed of an Ni (44-47 wt %)-Fe (56-53 wt %) alloy.

18. The perpendicular recording magnetic head according to claim 16, wherein the pedestal magnetic pole piece is an Ni (44-47 wt %)-Fe (56-53 wt %) alloy or a permalloy magnetic film formed of at least an NiFe alloy.

* * * * *